United States Patent
Bennek et al.

(10) Patent No.: US 9,416,891 B2
(45) Date of Patent: Aug. 16, 2016

(54) ELECTROMAGNETIC ACTUATOR FOR A SOLENOID VALVE, A VALVE TERMINAL WITH AT LEAST ONE SOLENOID VALVE, AND A MODULE ARRANGEMENT THAT INCLUDES AT LEAST ONE SOLENOID VALVE

(71) Applicant: Buerkert Werke GmbH, Ingelfingen (DE)

(72) Inventors: Werner Bennek, Iserlohn (DE); Kai-Ulrich Seifer, Neunkirchen (DE); Heiko Kurtz, Frankfurt (DE); Wolfgang Hess, Buch a. Ammersee (DE); Andreas Grau, Erzhausen (DE)

(73) Assignee: Buerkert Werke GmbH, Ingelfingen (DE)

( * ) Notice: Subject to any disclaimer, the term of this patent is extended or adjusted under 35 U.S.C. 154(b) by 2 days.

(21) Appl. No.: 14/477,081

(22) Filed: Sep. 4, 2014

(65) Prior Publication Data
US 2015/0069280 A1 Mar. 12, 2015

(30) Foreign Application Priority Data
Sep. 11, 2013 (DE) .................... 20 2013 007 990 U

(51) Int. Cl.
*H01F 7/20* (2006.01)
*F16K 31/06* (2006.01)
*F15B 20/00* (2006.01)
*H01F 7/127* (2006.01)
*H01F 7/16* (2006.01)
*F15B 13/08* (2006.01)
*H01F 7/06* (2006.01)

(52) U.S. Cl.
CPC ......... *F16K 31/0675* (2013.01); *F15B 13/0846* (2013.01); *F15B 20/00* (2013.01); *H01F 7/127* (2013.01); *H01F 7/16* (2013.01); *F15B 13/0817* (2013.01); *F15B 13/0839* (2013.01); *H01F 2007/062* (2013.01)

(58) Field of Classification Search
CPC ..... H01F 7/127; H01F 7/16; H01F 2007/062; F15B 13/0846; F15B 20/00; F15B 13/0817; F15B 13/0839; F16K 31/0675
See application file for complete search history.

(56) References Cited

U.S. PATENT DOCUMENTS

| 7,187,091 | B2 | 3/2007 | Veil et al. |
| 7,198,065 | B2 | 4/2007 | Vester |
| 8,151,823 | B2 | 4/2012 | Gehrke et al. |
| 8,156,965 | B2 | 4/2012 | Kremser et al. |
| 2014/0167891 | A1* | 6/2014 | Blondel .................. H01H 9/20 335/202 |

FOREIGN PATENT DOCUMENTS

| DE | 10061686 A1 | 6/2001 |
| EP | 2402829 A1 | 1/2012 |

* cited by examiner

*Primary Examiner* — Bernard Rojas
(74) *Attorney, Agent, or Firm* — Carlson, Gaskey & Olds, PC

(57) ABSTRACT

In an electromagnetic actuator for a solenoid valve, the electromagnetic actuator has a magnetic coil and a first electrical connector adapted to receive a control signal which determines a switching position of the electromagnetic actuator. The electromagnetic actuator further has a second electrical connector which is provided directly on the electromagnetic actuator and is separate with respect to the first electrical connector. The magnetic coil and the first electrical connector are coupled by an electrical connection which is interrupted at the second electrical connector. Further proposed are a valve terminal having at least one solenoid valve, and a module arrangement.

17 Claims, 3 Drawing Sheets

ELECTROMAGNETIC ACTUATOR FOR A SOLENOID VALVE, A VALVE TERMINAL WITH AT LEAST ONE SOLENOID VALVE, AND A MODULE ARRANGEMENT THAT INCLUDES AT LEAST ONE SOLENOID VALVE

RELATED APPLICATION

This application claims priority to DE Application 20 2013 007 990.8, filed 11 Sep. 2013.

TECHNICAL FIELD

The present invention relates to an electromagnetic actuator for a solenoid valve. The invention further relates to a valve terminal including at least one solenoid valve having at least one magnetic coil. Finally, the invention relates to a module arrangement including a plurality of modules arranged next to each other along a row direction.

BACKGROUND

Electromagnetic actuators are employed for solenoid valves in many fields of process and manufacturing automation. In many cases, a plurality of solenoid valves are combined in a valve terminal or in a valve block, for example for electro-pneumatic process control. Valves in a valve terminal are typically controlled by a field bus or by an individual connection. If a fault occurs in driving the valve terminal, for example on the field bus, it is technically difficult or even impossible in the case of a bus-controlled valve terminal to safely switch off individual valves or to place them in a safe operating condition. This, however, is desirable in order to be able to safely carry out, within the process chain, a protective measure initiated in the event of a fault.

EP 2 026 156 B1 discloses a module arrangement, consisting of solenoid valves, sensor modules, intermediate modules, etc., which furthermore includes a safety module. The safety module interrupts the power supply of a partial group of modules of the arrangement which directly adjoins the safety module; these modules can thus be switched off in the event of a fault. However, provision is not made for a switch-off of individual modules. In addition, the safety module is also driven via the bus of the module arrangement. When a fault occurs on the bus, a safe switch-off is not possible.

SUMMARY

It is an object of the invention to indicate an improved electromagnetic actuator, an improved valve terminal, and an improved module arrangement which at least partly overcome the problems existing in the prior art.

According to a first aspect of the invention, an electromagnetic actuator for a solenoid valve is indicated. The electromagnetic actuator comprises a magnetic coil and a first electrical connector adapted to receive a control signal which determines the switching position of the electromagnetic actuator. Furthermore, the electromagnetic actuator comprises a second electrical connector which is provided directly on the actuator and is separate with respect to the first electrical connector. The magnetic coil and the first electrical connector are coupled by an electrical connection which is interrupted at the second electrical connector. The two separate electrical connectors may, in particular, be spatially and structurally separate connector plugs.

In other words, the supply line of the magnetic coil is led out through a housing of the electromagnetic actuator at the second electrical connector and is interrupted at this connector. This provides the possibility of placing the actuator in a safe operating condition by interrupting the power supply of the magnetic coil, independently of the control signals received at the first electrical connector. For this purpose, more particularly an external switch may be connected to the second electrical connector. This switch is closed in normal operation, so that the actuator may be driven by a field bus interface or by an individual connection, for example. The respective control signals are received at the first electrical connector. In the event of a fault, or when a safety chain is initiated, the voltage supply of the magnetic coil can be interrupted with the aid of a safety circuit coupled to the second electrical connector. The series connection of the external switch with the standard electrical connection ensures in the event of a fault that the electromagnetic actuator is placed in a safe operating condition. This is advantageously effected independently of the process control used in normal operation.

The electromagnetic actuator according to aspects of the invention is suitable in particular for refitting or upgrading existing installations or systems with a view to their safety technology and safety requirements. For this purpose, an electromagnetic actuator according to any of the exemplary embodiments of the invention may be simply substituted for a conventional electromagnetic actuator. Any further modifications of the installation are not necessary. The additional electrical connector allows a safety switch-off to be provided without any difficulty for individual solenoid valves, without this entailing any further measures. It is advantageous that, for example, any clamping points or cable heads to be additionally mounted can be dispensed with. In this way, it is considerably easier to refit and upgrade existing systems and, as a result, the assembly effort is substantially reduced in comparison with conventional solutions.

According to one embodiment, the electromagnetic actuator further comprises a housing having the magnetic coil arranged in its interior. The first and second electrical connectors are more particularly first and second plugs and are arranged directly on an outside of the housing. More particularly, the first and second electrical connectors are arranged at different positions on the electromagnetic actuator, in particular at different places on the housing of the electromagnetic actuator. There is thus provided a certain distance between the first and second electrical connectors.

A further embodiment of the electromagnetic actuator comprises an external switch which is arranged outside of a housing of the electromagnetic actuator. The external switch is coupled to the second electrical connector such that it constitutes a series connection with the magnetic coil and the first electrical connector. Moreover, depending on its switch position, the external switch is adapted to close or to interrupt the electrical connection between the first electrical connector and the magnetic coil. Preferably, the external switch is floating.

The external switch may be adapted to be held in the closed state by a voltage applied. If this voltage is no longer applied or drops below a predefined limit value, the switch will open. It is also possible to use a switch that is transferred to the closed state when a voltage is applied.

The embodiments mentioned allow individual solenoid valves, in particular within a valve terminal or within a valve block, to be selectively switched off or placed in a safe operating condition with the aid of an external safety circuit which applies an appropriate interrupter signal to the external switch. For this purpose, the external switch is adapted to receive a respective interrupter signal from a safety-oriented control logic.

In particular, first and second plugs may be used which constitute the first and second electrical connectors, the plugs used being of different design. While the first electrical connector may more particularly be a bus connector adapted to receive field bus signals, or signals for an individual control, the second electrical connector or plug may more particularly be a circular plug. For example, circular plugs of the M8 or M12 type may be employed.

The electromagnetic actuator is suitable in particular for pilot or control valves within a valve terminal, a valve block, or in a control head. In this way, a protective measure initiated in the event of a fault can be safely performed within the process chain. According to a further embodiment, the electromagnetic actuator furthermore comprises an internal controller, in particular a power control, which may be coupled on the input side to the first electrical connector. It receives a control signal and outputs a power signal on the output side to the magnetic coil. The electrical connection interrupted at the second electrical connector is part of an electrical connecting link between the output of the internal controller and the magnetic coil. Due to the fact that the interruption provided for at the second electrical connector is effected in the power section of the aforesaid circuit, a safe switch-off can be performed even when the internal controller exhibits a malfunction, as caused, for example, by a fault on the internal bus. This design of the electromagnetic actuator improves the reliability of the switch-off in the event of a fault.

According to a further aspect of the invention, a valve terminal is indicated which includes at least one solenoid valve having at least one magnetic coil. The valve terminal includes a first electrical connector adapted to receive a control signal which determines the switching position of the at least one solenoid valve. The valve terminal further includes a second electrical connector which is arranged directly on the solenoid valve and is separate with respect to the first electrical connector. The magnetic coil of the at least one valve and the first electrical connector are coupled by an electrical connection which is interrupted at the second electrical connector. More particularly, the solenoid valve is a pilot valve or control valve within the valve terminal.

According to one embodiment, the valve terminal is built up of individual fluidic modules which are coupled to one another. Each of these modules has a housing which is referred to as an individual housing. The individual housings of the modules jointly form a housing of the valve terminal. The first and second electrical connectors are more particularly first and second plugs and are arranged directly on an outside of this joint or shared housing. The first and second electrical connectors may be arranged at different positions or locations on this shared housing. This means that a certain distance is provided between the two connectors.

According to a further embodiment, the valve terminal further includes an external switch which is coupled to form a series connection with the magnetic coil and the first electrical connector. The external switch is furthermore adapted to close or to interrupt the electrical connection between the first electrical connector at the valve terminal and the magnetic coil of the at least one solenoid valve, depending on its switch position. The external switch may be floating. It may, in addition, be adapted to be held in the closed state by a voltage applied. As soon as this voltage is absent, the switch will open. It is, however, also possible to use a switch that is transferred to the closed state when a voltage is applied. The external switch may further be part of an external safety circuit which additionally comprises a safety-oriented control logic. The safety-oriented control logic is adapted to open or to close the switching state of the switch in accordance with an interrupter signal output to the switch.

According to a further embodiment, the valve terminal may be built up of individual fluidic modules which are coupled among one another. The individual modules may be coupled or connected to each other electrically and/or fluidically. The second electrical connector may be more particularly a plug and may be arranged directly on the outside of the housing of that solenoid valve which is intended to be equipped with the corresponding safety function. The first and second electrical connectors are separate, which means that they are arranged at different places of the valve terminal. In particular, the first electrical connector may be arranged on the individual housing of a head module of the valve terminal, and the second electrical connector may be arranged directly on the individual housing of the solenoid valve which has the option of a safety switch-off at its disposal.

According to further embodiments, the first electrical connector may be adapted to receive field bus signals or signals for an individual control for the at least one solenoid valve. The second electrical connector differs from the first electrical connector in terms of its design and may more particularly be a circular plug. Suitable circular plugs include those of the M8 or M12 type, for example.

A certain distance is provided between the first and second electrical connectors; the same applies to the first and second electrical plugs. The first and second plugs are self-contained and structurally separate from each other. In this sense, the connectors are separate.

According to a further embodiment, the valve terminal includes a head module, which may have the first electrical connector arranged thereon. The control signals received at the first electrical connector are communicated on an internal bus between the individual modules of the valve terminal. The second electrical connector is not arranged on the head module, but directly on the housing of the at least one solenoid valve.

Further advantages and options for a further development, which have already been mentioned with respect to the electromagnetic actuator, are applicable in the same or a similar manner to the valve terminal as well and will therefore not be repeated.

According to a further aspect of the invention, a module arrangement is indicated. This module arrangement may be a valve terminal or a valve block. The module arrangement comprises a plurality of modules which are arranged next to each other along a row direction and are electrically and fluidically connected among one another. At least one of these modules is a solenoid valve. The solenoid valve may be provided with, and is driven by, an electromagnetic actuator according to aspects of the invention.

The module arrangement offers the same or similar advantages as have already been mentioned in respect of the electromagnetic actuator and for the valve terminal. In addition, the module arrangement may be developed further in accordance with the aspects mentioned with respect to the electromagnetic actuator and the valve terminal.

BRIEF DESCRIPTION OF THE DRAWINGS

Further aspects and features of the invention will be apparent from the description of preferred exemplary embodiments below, in which reference is made to the accompanying drawings. In the drawings.

DETAILED DESCRIPTION

Figure 1:
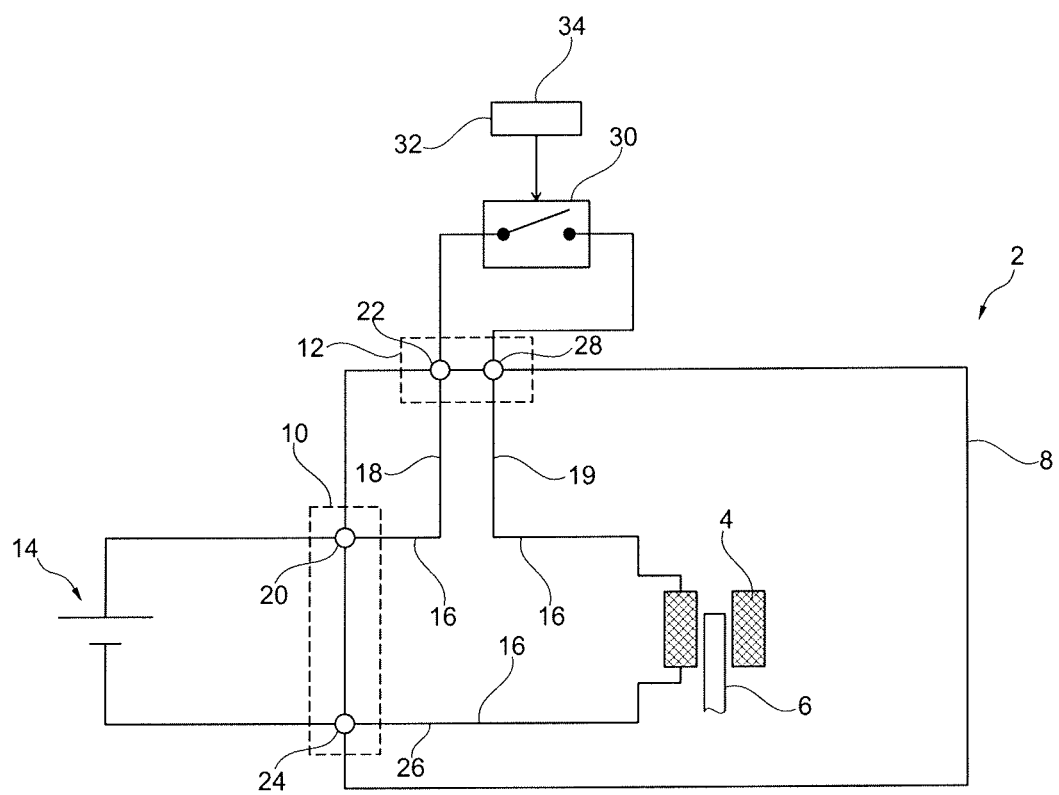
FIG. 1 shows a simplified schematic circuit diagram of an electromagnetic actuator according to an exemplary embodiment of the invention.

FIG. 1 shows a simplified schematic circuit diagram of an electromagnetic actuator 2 according to an exemplary embodiment of the invention. The actuator 2 comprises a magnetic coil 4 for driving a core 6 which is coupled to a valve arrangement (not shown) to actuate the latter. A first electrical connector 10 and, at a specific distance therefrom, a second electrical connector 12 are provided at the outside of a housing 8 of the electromagnetic actuator 2. The first and second electrical connectors 10, 12 are separate, i.e. they are located at different places, preferably at the outside of the housing 8. More particularly, the first and second electrical connectors 10, 12 are separate plugs. For example, the first electrical connector 10 may be a multipin bus connector suitable for a field bus control or an individual connection. The second electrical connector 12 may, in particular, be a circular plug, for example of the M8 or M12 type.

An external power source 14 is coupled to the first electrical connector 10 and is controlled such that a control signal determining the switching position of the electromagnetic drive 2 is received via the first electrical connector 10. More particularly, the external power source 14 can supply the magnetic coil 4 with a control current which determines the switching state of a valve coupled to the core 6. A first electrical connecting line 16 between the first electrical connector 10 and the magnetic coil 4 is interrupted at the second electrical connector 12. In other words, a first section 18 of said first electrical connecting line 16 leads from a first contact 20 of the first electrical connector 10 to a first contact 22 of the second electrical connector 12. The second contact 24 of the first electrical connector 10 is coupled directly to the magnetic coil 4 by a second electrical connecting line 26. A second section 19 of the first electrical connecting line 16 connects a second contact 28 of the second electrical connector 12 to the magnetic coil 4. The power supply of the magnetic coil 4 thus is interrupted between the two contacts 22, 28 of the second electrical connector 12. An external switch 30 is coupled to the second electrical connector 12. More precisely, this external switch 30 is coupled on one side to the first contact 22 and by its opposite, second side to the second contact 28 of the second electrical connector 12.

The above-mentioned electrical couplings may more particularly be direct electrical connections or connecting lines.

The switching position of the external switch 30 is controlled by an interrupter signal 32 which is output to the switch 30 by a safety-oriented control logic 34. The external switch 30 and the control logic 34 jointly form an external safety circuit. Both the switch 30 and the safety-oriented control logic 34 are located outside of the housing 8 of the electromagnetic actuator 2 and, in this sense, are separate or external.

In particular, the external switch 30 is operated to be floating. It may further be adapted to be held in the closed state by a voltage applied. As soon as the voltage is absent, the switch 30 will open. It is also possible that the switch 30 is designed to be transferred to the closed state upon application of a voltage. This means that, in the first case, the interrupter signal 32 output by the safety-oriented control logic 34 consists in that a voltage is switched off. In the second case, the interrupter signal 32 is constituted by an appropriate voltage applied to the switch 30 so that it opens.

The electromagnetic actuator 2 shown in FIG. 1 serves for the implementation of safety guidelines, in particular in an electro-pneumatic control in the field of process and manufacturing automation. The actuator 2 may thus be used in particular for pilot or control valves on valve terminals, valve blocks, or control heads.

Advantageously, in case of a fault, the safety-oriented control logic 34 initiates a protective measure by outputting the interrupter signal 32. This results in that the switch 30 will open so that the power supply to the magnetic coil 4 is interrupted. This allows an individual solenoid valve, in particular within a valve terminal or within a valve block, to be switched off separately and safely with the aid of the electromagnetic actuator 2. In normal operation, the electromagnetic actuator 2 is driven by a field bus interface or an individual connection, for example, the signals of which are received on the first electrical connector 10. When a fault occurs on the BUS control, it is possible, owing to the separate second electrical connector 12, to transfer the electromagnetic actuator 2 to a safe condition with the aid of the separate safety-oriented control logic 34. The switch-off is effected fully independently of the BUS control.

Figure 2:
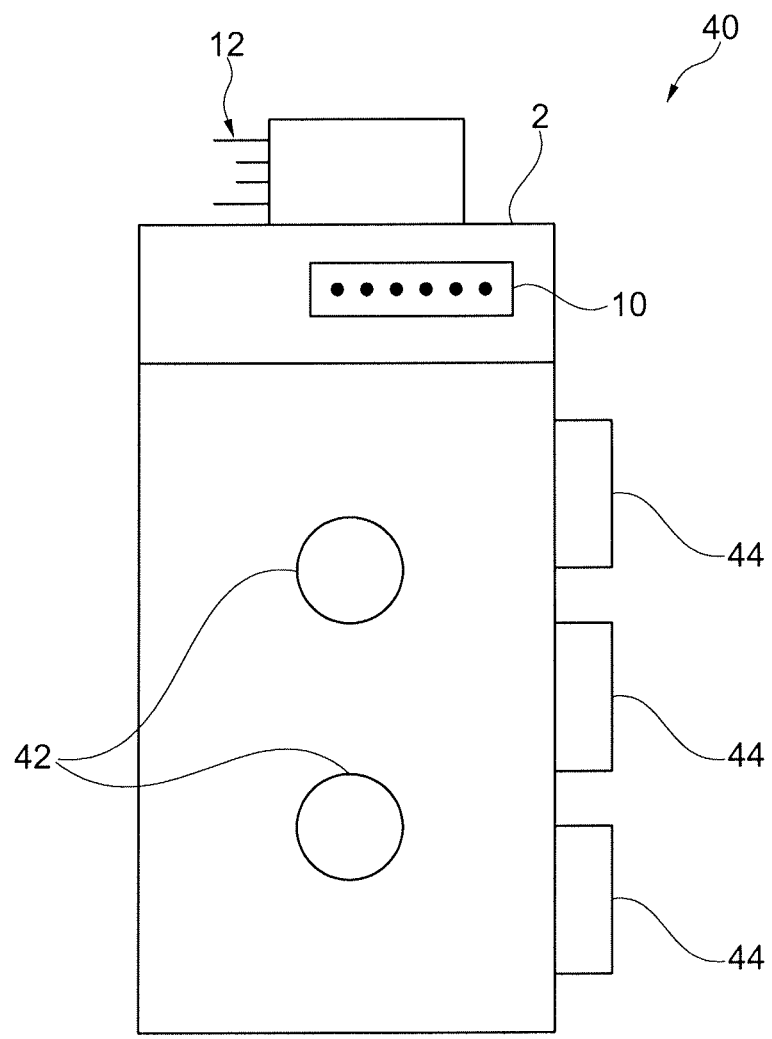
FIG. 2 shows a simplified side view of a solenoid valve according to a further exemplary embodiment of the invention.

FIG. 2 shows a simplified side view of a solenoid valve 40 according to a further exemplary embodiment of the invention. The solenoid valve 40 is provided with an electromagnetic actuator 2 according to any of the exemplary embodiments mentioned.

The solenoid valve 40 has fluidic supply channels 42 which preferably extend in a row direction, so that a plurality of individual modules such as, for example, the solenoid valve 40 shown can be arranged side by side in this row direction and can be supplied through the fluidic supply channels 42. A corresponding module arrangement may additionally comprise supply and sensor modules, intermediate modules, etc. In addition, the solenoid valve 40 is provided with fluid ports 44 which are suitable for the connection of pressure lines for process control, for example. The electromagnetic actuator 2 comprises a first electrical connector 10 which, according to the exemplary embodiment of FIG. 2, is a bus connection. Furthermore, the electromagnetic actuator 2 comprises a separate, second connector 12. As illustrated in FIG. 1, an external safety circuit including in particular an external switch 30 may be connected thereto.

Figure 3:
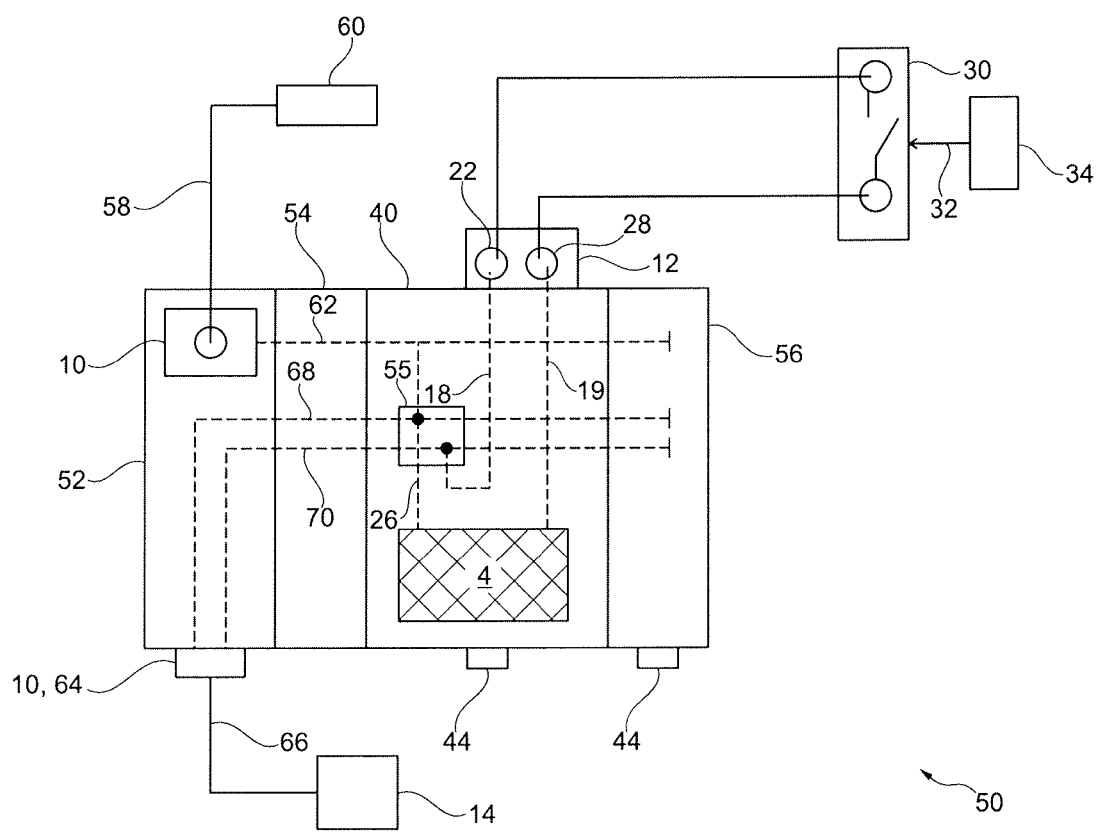
FIG. 3 shows a simplified schematic diagram of a valve terminal according to an exemplary embodiment of the invention.

FIG. 3 shows a schematic view of a valve terminal 50 according to an exemplary embodiment of the invention. The valve terminal 50 comprises a plurality of modules, by way of example a control module 52, a sensor module 54, a solenoid valve 40 according to an exemplary embodiment of the invention, and a conventional solenoid valve 56. The number and configuration shown of the modules 52, 54, 40 and 56 is given only as an example. The valve terminal 50 may, of course, be expanded by further modules, for example additional solenoid valves, sensor modules, feed modules, intermediate modules, etc.

Provided on the control module 52 is a first electrical connector 10 which, by way of example, also is a bus connection which is coupled to a controller 60 via an external bus line 58. The control signals received from the controller 60 at the first connector 10 are passed on between the individual modules 52, 54, 40 and 56 on an internal bus 62. The control module 52 further comprises an electrical supply connection 64 which supplies power to an internal electrical supply line

66. The supply connection 64 is coupled to an external power source 14. The individual modules 52, 54, 56 and 40 of the valve terminal 50 are supplied with the necessary operating voltage via first and second internal electrical supply lines 70, 68.

The electromagnetic actuators (not illustrated separately) of the individual modules 40 are provided with an internal controller 55 coupled on the input side both to the internal bus line 62 and to the internal electrical supply line 66. This is shown in FIG. 3 for the solenoid valve 40 as an example. A control signal is received on the internal bus line 62, so that a power control signal can be output to the magnetic coil 4 on the output side on the internal controller 55. At the second electrical connector 12, the electrical connecting link between the output of the internal controller 55 and the magnetic coil 4 is interrupted.

In other words, the first contact 22 of the second electrical connector 12 is coupled to the first internal electrical supply line 70 via the first section 18. The second contact 28 of the second electrical connector 12 is coupled to the magnetic coil 4 via the second section 19. The second connecting line 26 couples the second internal supply line 68 directly to the magnetic coil 4. The aforesaid couplings may be direct electrical connections. They may be realized by conductor tracks or cables, for example.

The solenoid valve 40 may in particular be a valve having a safety-relevant function. Thus, the fluid port 44 may, for example, supply pressure lines fulfilling a safety-relevant function in a process and automation system. In contrast to this, the solenoid valve 56, by way of example, is a conventional valve without a safety-relevant function. This means that a control that is not or less safety-relevant is effected at its fluid port 44. For this reason, the solenoid valve 56 is not provided with a second connector 12 and is controlled merely via the internal bus line 62.

In order to allow the safety-relevant solenoid valve 40 to be reliably placed in a safe operating condition even in the event of a fault on the internal bus line 62, an external switch 30, which is part of an external safety circuit, is connected to the second electrical connector 12. The external switch 30 has a first side connected to the first contact 22 of the second electrical connector 12 and an opposite, second side connected to the second contact 28 of the second electrical connector 12. The switching state of the external switch 30 is determined by the interrupter signal 32 which is received from the safety-oriented control logic 34.

In the valve terminal 50 shown in FIG. 3, the solenoid valve 40 can be switched off separately or placed in a safe operating condition with the aid of the external safety-oriented control logic 34 by interrupting the power supply to the magnetic coil 4, independently of the communication on the internal bus line 62, in particular in the event of a malfunction. In this connection it is advantageous that the solenoid valve 40 includes a separate, second electrical connector 12 which is provided directly at the solenoid valve 40 and which is independent of the control that, in normal operation, is effected via the first connector 10.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. An electromagnetic actuator for a solenoid valve, comprising:
    a magnetic coil;
    a first electrical connector adapted to receive a control signal which determines a switching position of the electromagnetic actuator;
    a second electrical connector which is provided directly on the electromagnetic actuator and is separate with respect to the first electrical connector, and wherein the magnetic coil and the first electrical connector are coupled by an electrical connection which is interrupted at the second electrical connector; and
    an external switch which is arranged outside of a housing of the electromagnetic actuator and is coupled to the second electrical connector to provide a series connection with the magnetic coil and the first electrical connector, the external switch being adapted to close or to interrupt an electrical connection between the first electrical connector and the magnetic coil dependent on switch position, and wherein the external switch is part of an external safety circuit which comprises a safety-oriented control logic which controls a switching state of the external switch by an interrupter signal.

2. The electromagnetic actuator according to claim 1, further comprising a housing having the magnetic coil arranged in an interior of the housing, the first and second electrical connectors comprising first and second plugs that are arranged directly on an outside of the housing.

3. The electromagnetic actuator according to claim 1, wherein the first and second electrical connectors comprise first and second plugs and are arranged at different positions on a housing of the electromagnetic actuator so that there is a distance between the first and second electrical connectors.

4. The electromagnetic actuator according to claim 1, wherein the external switch is floating.

5. The electromagnetic actuator according to claim 1, wherein the first electrical connector is constructed to receive control signals of a field bus or control signals for an individual activation to drive the magnetic coil, and wherein the second electrical connector is different than the first electrical connector.

6. The electromagnetic actuator according to claim 1, further comprising an internal controller which is coupled on an input side to the first electrical connector and receives a control signal, and which on an output side outputs a power control signal to the magnetic coil, and wherein an electrical connection is interrupted at the second electrical connector as part of an electrical connecting link between the output side of the internal controller and the magnetic coil.

7. A valve terminal comprising:
    at least one solenoid valve having at least one magnetic coil, a first electrical connector adapted to receive a control signal which determines a switching position of the at least one solenoid valve, and at least one second electrical connector which is arranged directly on the at least one solenoid valve and is separate with respect to the first electrical connector, the magnetic coil of the at least one solenoid valve and the first electrical connector being coupled by an electrical connection which is interrupted at the second electrical connector; and
    an external switch which is arranged outside of a joint housing of the valve terminal formed by individual housings of modules of the valve terminal, and wherein the external switch is coupled to the second electrical connector to provide a series connection with the magnetic coil and the first electrical connector, and wherein the external switch is adapted to close or to interrupt an electrical connection between the first electrical connector and the magnetic coil of the at least one solenoid valve dependent on switch position wherein the external switch is part of an external safety circuit which comprises a safety-oriented control logic which controls a switching state of the external switch by an interrupter signal.

8. The valve terminal according to claim 7, wherein the at least one solenoid valve is a pilot valve or control valve of the valve terminal.

9. The valve terminal according to claim 7, including individual fluidic modules which are coupled to one another and have individual housings forming a joint housing of the valve terminal, the first and second electrical connectors comprising first and second plugs and being arranged directly on an outside of the joint housing.

10. The valve terminal according to claim 9, wherein the first and second electrical connectors are arranged at different positions on the joint housing so that there is a distance between the first and second electrical connectors.

11. The valve terminal according to claim 10, wherein the first electrical connector is arranged on the individual housing of a head module and the second electrical connector is arranged directly on the individual housing of the at least one solenoid valve.

12. The valve terminal according to claim 7, wherein the external switch is floating.

13. The valve terminal according to claim 7, wherein the first electrical connector is constructed to receive control signals of a field bus or control signals for an individual activation, at least for the at least one solenoid valve, and wherein the second electrical connector is different than the first electrical connector.

14. A module arrangement comprising:
a plurality of modules which are arranged next to each other along a row direction and are electrically and fluidically connected among one another, one of the modules of the module arrangement being in the form of at least one solenoid valve, said solenoid valve being driven by an electromagnetic actuator comprising a magnetic coil, a first electrical connector adapted to receive a control signal which determines a switching position of the electromagnetic actuator, a second electrical connector which is provided directly on the electromagnetic actuator and is separate with respect to the first electrical connector, and wherein the magnetic coil and the first electrical connector are coupled by an electrical connection which is interrupted at the second electrical connector; and
the solenoid valve further comprising an external switch which is arranged outside of a joint housing of the valve terminal formed by individual housings of modules of the valve terminal, and wherein the external switch is coupled to the second electrical connector to provide a series connection with the magnetic coil and the first electrical connector, and wherein the external switch is adapted to close or to interrupt an electrical connection between the first electrical connector and the magnetic coil of the at least one solenoid valve dependent on switch position wherein the external switch is part of an external safety circuit which comprises a safety-oriented control logic which controls a switching state of the external switch by an interrupter signal.

15. An electromagnetic actuator for a solenoid valve, comprising:
a magnetic coil;
a first electrical connector adapted to receive a control signal which determines a switching position of the electromagnetic actuator;
a second electrical connector which is provided directly on the electromagnetic actuator and is separate with respect to the first electrical connector, and wherein the magnetic coil and the first electrical connector are coupled by an electrical connection which is interrupted at the second electrical connector; and
an internal controller which is coupled on an input side to the first electrical connector and receives a control signal, and which on an output side outputs a power control signal to the magnetic coil, and wherein an electrical connection is interrupted at the second electrical connector as part of an electrical connecting link between the output side of the internal controller and the magnetic coil.

16. A valve terminal comprising:
at least one solenoid valve having at least one magnetic coil, a first electrical connector adapted to receive a control signal which determines a switching position of the at least one solenoid valve, and at least one second electrical connector which is arranged directly on the at least one solenoid valve and is separate with respect to the first electrical connector, the magnetic coil of the at least one solenoid valve and the first electrical connector being coupled by an electrical connection which is interrupted at the second electrical connector; and
an internal controller which is coupled on an input side to the first electrical connector and receives a control signal, and which on an output side outputs a power control signal to the magnetic coil, and wherein an electrical connection is interrupted at the second electrical connector as part of an electrical connecting link between the output side of the internal controller and the magnetic coil.

17. A module arrangement comprising:
a plurality of modules which are arranged next to each other along a row direction and are electrically and fluidically connected among one another, one of the modules of the module arrangement being in the form of at least one solenoid valve, said solenoid valve being driven by an electromagnetic actuator comprising a magnetic coil, a first electrical connector adapted to receive a control signal which determines a switching position of the electromagnetic actuator, a second electrical connector which is provided directly on the electromagnetic actuator and is separate with respect to the first electrical connector, and wherein the magnetic coil and the first electrical connector are coupled by an electrical connection which is interrupted at the second electrical connector, the solenoid valve further comprising an internal controller which is coupled on an input side to the first electrical connector and receives a control signal, and which on an output side outputs a power control signal to the magnetic coil, and wherein an electrical connection is interrupted at the second electrical connector as part of an electrical connecting link between the output side of the internal controller and the magnetic coil.

* * * * *